United States Patent [19]

Friefeld et al.

[11] 4,418,683
[45] Dec. 6, 1983

[54] SEPARATED PHASE THERMAL STORAGE SYSTEM

[75] Inventors: Jerome M. Friefeld, Agoura; Joseph Friedman, Encino, both of Calif.

[73] Assignee: Rockwell International Corporation, El Segundo, Calif.

[21] Appl. No.: 256,641

[22] Filed: Apr. 23, 1981

[51] Int. Cl.³ .................. F24H 7/00; F28D 13/00; C09K 5/00
[52] U.S. Cl. ................ 126/400; 165/104.13; 252/71
[58] Field of Search ............ 165/104.32, 104.27, 165/104.13, DIG. 4, 104.15, 104.21, 104.34; 126/400, 900; 252/71

[56] References Cited

U.S. PATENT DOCUMENTS 4,192,144  3/1980  Pierce .......................... 126/400

FOREIGN PATENT DOCUMENTS 1937782  2/1971  Fed. Rep. of Germany ................ 165/104.21

Primary Examiner—Samuel Scott
Assistant Examiner—G. Anderson
Attorney, Agent, or Firm—H. Fredrick Hamann; Harry B. Field

[57] ABSTRACT

A thermal storage system employing a fluid having a relatively high boiling point and capable of storage in separate phases, together with a substantial quantity of a chemically-compatible solid thermal storage medium.

2 Claims, 1 Drawing Figure

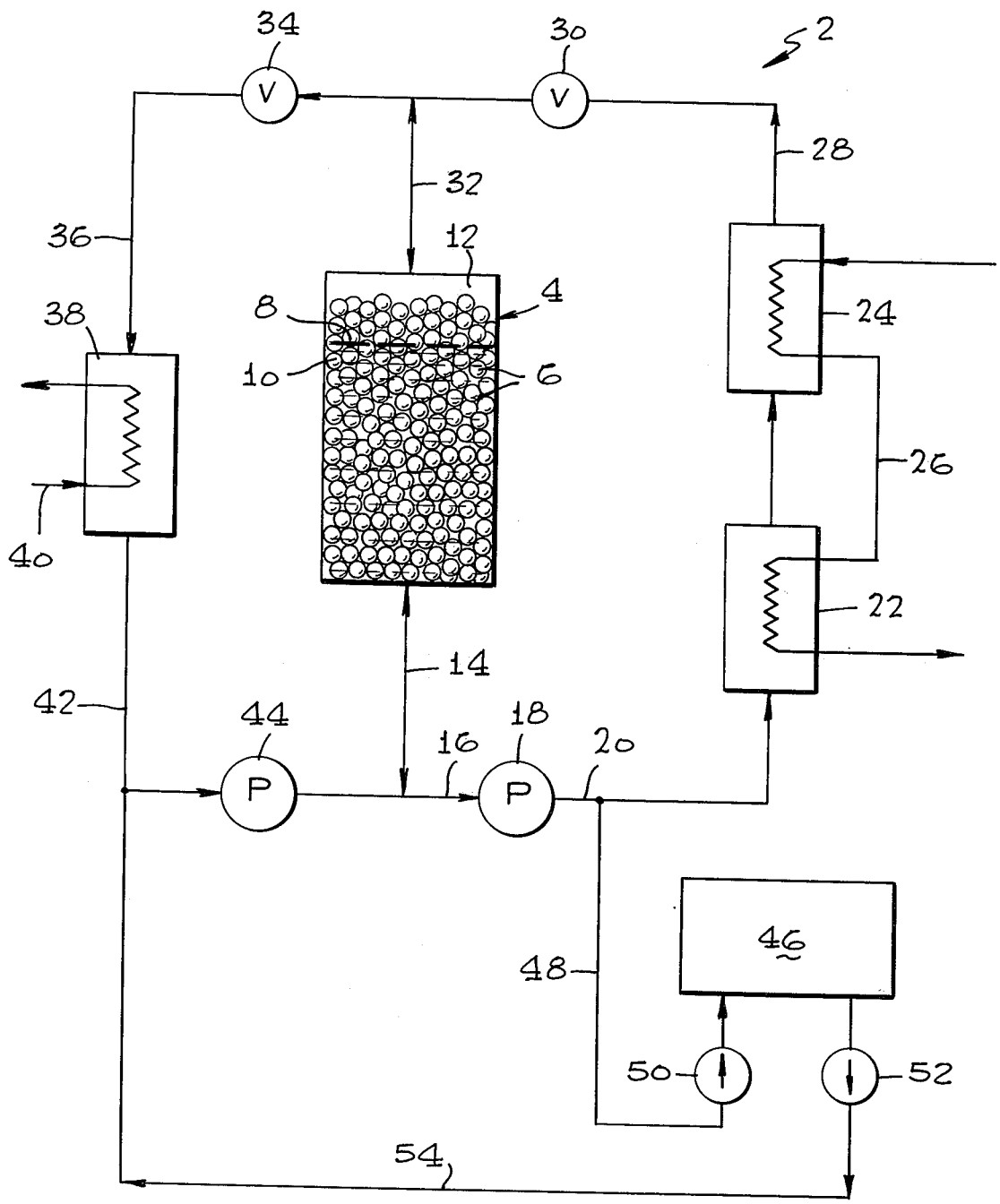

SEPARATED PHASE THERMAL STORAGE SYSTEM

BACKGROUND OF INVENTION

1. Field of the Invention

This invention relates to thermal storage and is particularly directed to methods and apparatus for storing thermal energy in solar energy systems and the like.

2. Description of the Prior Art

In recent years, the world has become aware that its oil reserves are finite and are approaching depletion. As a result, there has been considerable study of alternative energy sources. One of the most promising of these alternatives is solar energy. However, due to diurnal temperature changes, cloudiness and various other matters, the problem of thermal storage has been one of the major obstacles to widespread acceptance of solar energy systems, especially for large scale systems, such as municipal utilities.

One technique for solving the problem of thermal storage is taught in U.S. Pat. No. 4,124,061, issued Nov. 7, 1978, to Rex. C. Mitchell et al. This technique constituted a significant step forward in the art of thermal storage. However, the temperatures which the Mitchell et al system is capable of storing are extremely limited. Consequently, the search for improved thermal storage concepts has continued.

BRIEF SUMMARY AND OBJECTS OF THE INVENTION

These disadvantages of the prior art are overcome with the present invention and a thermal storage technique is provided which is capable of storing temperatures several times greater than could be stored by prior art systems.

The advantages of the present invention are preferably achieved by providing a dual medium thermal storage system employing a fluid having a relatively high boiling point greater than about 500° F., for example, and capable of storage in separate phases, together with a substantial quantity of a chemically-compatible solid thermal storage medium. Thus, for example, sulfur has a normal boiling point of 830° F. and can be stored in separate phases, as a liquid and as a superheated vapor, at temperatures up to about 1000° F., together with a substantial quantity of solid iron pyrite. Such temperatures are close to the upper limits of the operating range of much of the existing turbogenerators and the like.

Accordingly, it is an object of the present invention to provide improved thermal storage techniques.

Another object of the present invention is to provide a thermal storage mechanism capable of storing temperatures up to about 1000° F.

An additional object of the present invention is to provide a separated-phase, dual medium thermal storage system.

A specific object of the present invention is to provide a thermal storage system employing a fluid having a relatively high boiling point and capable of storage in separate phases, together with a substantial quantity of a chemically-compatible solid thermal storage medium.

These and other objects and features of the present invention will be apparent from the following detailed description, taken with reference to the accompanying drawing.

BRIEF DESCRIPTION OF THE DRAWING

In the drawing:

The FIGURE is a diagrammatic representation of a thermal storage system embodying the present invention.

DETAILED DESCRIPTION OF THE INVENTION

In that form of the present invention chosen for purposes of illustration, the FIGURE shows a thermal storage system, indicated generally at 2, having a storage tank 4 that is substantially filled with particles of a solid, thermal-transfer material 6 having the interstices filled to a desired level 8 with a suitable thermal storage fluid 10. The thermal storage fluid 10 has a relatively high boiling point, above about 500° F., and is capable of being heated to still higher temperatures in its vapor phase which can exist separately within the tank 2, as in the region 12 above the fluid level 8.

The bottom of tank 4 is connected by conduit 14 and 16, pump 18 and conduit 20 to an evaporator 22 and superheater 24, which are supplied, via conduit 26 with high temperature fluid from a suitable energy source, not shown, such as a solar energy receiver. The superheater 24 is connected by conduit 28, valve 30, and conduit 32 to the top of tank 4. The tank 4 is also connected by conduit 32, valve 34 and conduit 36 to a heat exchanger 38, which serves to transfer thermal energy to fluid flowing through conduit 40 for delivery to suitable utilization means, not shown, such as a turbogenerator. The heat exchanger 38 is also connected by conduit 42, pump 44 and conduit 14 to the bottom of tank 4. In addition, a suitable overflow tank 46 is connected by conduit 48 and check valve 50 to receive fluid from conduit 20 and to deliver fluid via check valve 52 and conduit 54 to conduit 44 for return through pump 44 and conduit 14 to tank 4.

In use, when energy is to be stored, some of the thermal storage liquid 10 is supplied via conduits 14 and 16, pump 18 and conduit 20 to the evaporator 22, where thermal energy from conduit 26 serves to convert the liquid 10 into a vapor. This vapor receives additional thermal energy in superheater 24 and the superheated vapor is supplied via conduit 28, valve 30 and conduit 32 to the region 12 of tank 4 where it transfers some of its thermal energy for storage by the solid thermal storage medium 6. Since the fluid, whether gas or liquid, will occupy the same volume, some of the liquid 10, withdrawn from the tank 4, passes through conduit 48 and check valve 50 and is stored, at its original temperature, in the overflow tank 46.

To discharge energy from the storage tank 4, valve 30 is closed and valve 34 is opened. This allows the superheated vapor from region 12 of tank 4 to flow through conduit 32, valve 34 and conduit 36 to heat exchanger 38, where the heat is transferred to the fluid in conduit 40 and is delivered, via conduit 40, to the heat utilization means, not shown. In the heat exchanger 38, the vapor condenses to a liquid and flows through conduit 42, pump 44 and conduit 14 to the bottom of the tank 4. At the same time, pump 44 draws liquid from the overflow tank 46, via check valve 52 and conduit 54, to be delivered through conduit 14 to the bottom of tank 4.

Preferably, the tank 4 will have an aspect ratio (that is, the ratio of the height to the diameter of the tank 4) in the range of about 0.5 to 2.5 and the pumps 18 and 44 will produce flow velocities in the range of about 2 to 50 feet per hour. The thermal storage fluid may be substantially any desired fluid having good thermal storage characteristics, having a boiling point above about 500° F. and capable of existing separately in liquid and gaseous phases at atmospheric pressure. Sulfur has been found to be a satisfactory fluid, having a boiling point at 830° F. at atmospheric pressure and capable of being superheated and contained, in its gaseous phase, to about 1000° F. The solid thermal storage material will preferably be particulate, and will occupy about 50 to 95 percent of the volume of tank 4 and must be chemically compatible with the thermal storage fluid at elevated temperatures. Where sulfur is the thermal storage fluid, iron pyrite has been found to be satisfactory as the solid thermal storage medium.

Obviously, numerous variations and modifications can be made without departing from the present invention. Accordingly, it should be clearly understood that the form of the present invention described above and shown in the accompanying drawing is illustrative only and is not intended to limit the scope of the invention.

What is claimed and desired to be secured by Letters Patent of the United States is:

1. A thermal storage system comprising:
   a storage tank;
   a quantity of particulate iron pyrite situated within said storage tank as a heat storage material; and
   a quantity of sulfur located within said storage tank in contact with said pyrite as a heat exchange material.

2. The thermal storage system of claim 1 wherein said storage tank has a height-to-diameter ratio in the range of about 0.5 to 2.5.

* * * * *